United States Patent
Fabre et al.

(10) Patent No.: US 7,075,512 B1
(45) Date of Patent: Jul. 11, 2006

(54) METHOD AND SYSTEM FOR NAVIGATING A DISPLAY SCREEN FOR LOCATING A DESIRED ITEM OF INFORMATION

(75) Inventors: Gilles Fabre, Le Cres (FR); Jeff Parrish, Los Altos, CA (US)

(73) Assignee: PalmSource, Inc., Sunnyvale, CA (US)

( * ) Notice: Subject to any disclaimer, the term of this patent is extended or adjusted under 35 U.S.C. 154(b) by 174 days.

(21) Appl. No.: 10/071,816

(22) Filed: Feb. 7, 2002

(51) Int. Cl.
*G09G 5/00* (2006.01)

(52) U.S. Cl. ................ 345/156; 345/173; 345/660; 345/684; 715/800

(58) Field of Classification Search ........... 345/156, 345/173, 179, 684, 798, 799, 800, 815, 864, 345/660, 670, 671, 688; 715/798–801, 815, 715/864
See application file for complete search history.

(56) References Cited

U.S. PATENT DOCUMENTS

| | | | | |
|---|---|---|---|---|
| 4,790,028 A | * | 12/1988 | Ramage | 382/298 |
| 6,073,036 A | * | 6/2000 | Heikkinen et al. | 455/550.1 |
| 6,211,856 B1 | * | 4/2001 | Choi et al. | 345/666 |
| 6,321,158 B1 | * | 11/2001 | DeLorme et al. | 701/201 |
| 6,466,203 B1 | * | 10/2002 | Van Ee | 345/173 |
| 6,642,936 B1 | * | 11/2003 | Engholm et al. | 345/661 |
| 6,704,034 B1 | * | 3/2004 | Rodriguez et al. | 345/860 |
| 6,832,084 B1 | * | 12/2004 | Deo et al. | 455/419 |

* cited by examiner

*Primary Examiner*—Jimmy H. Nguyen
(74) *Attorney, Agent, or Firm*—Berry & Associates P.C.

(57) ABSTRACT

A method and a system for navigating a display screen to search for a desired item of information stored in an electronic device. The electronic device includes a novel fly over user interface (FOUI) capable of receiving commands from a user to provide a zoom out view of the display screen. A user may commence a navigation session by touching the display screen in a non active area or by clicking on a specifically designated icon to activate the user interface. During the navigation session, the display screen is zoomed-out and a magnifying area may appear on the display screen. The user interface enables the user to scroll the zoomed-out display screen by dragging the magnifying area towards an edge of the display screen to find a desired item of information. The display screen may be a display screen of a digital device (e.g., portable computer, personal computer, a cellular telephone, a digital watch, etc). The user may terminate a navigation session by removing the pointer from the display screen.

8 Claims, 10 Drawing Sheets

```
┌─────────────────────────────────────────────────────────┐
│ DISPLAY A PLURALITY OF ITEMS ON A TOUCH SCREEN OF A     │
│ PORTABLE COMPUTER DEVICE.                               │
│ 610                                                     │
└─────────────────────────────────────────────────────────┘
                            │
                            ▼
┌─────────────────────────────────────────────────────────┐
│ REGISTER A USER INPUT VIA THE TOUCH SCREEN TO ENTER A   │
│ MAGNIFICATION DISPLAY MODE.                             │
│ 620                                                     │
└─────────────────────────────────────────────────────────┘
                            │
                            ▼
┌─────────────────────────────────────────────────────────┐
│ PROVIDE A MAGNIFICATION AREA WITHIN THE TOUCH SCREEN,   │
│ WHERE THE MAGNIFICATION AREA PROVIDES A ZOOMED-OUT      │
│ VIEW OF ITEMS WITHIN THE MAGNIFICATION AREA WITH        │
│ RESPECT TO THE ITEMS OUTSIDE THE MAGNIFICATION AREA.    │
│                                                         │
│ 630                                                     │
└─────────────────────────────────────────────────────────┘
                            │
                            ▼
┌─────────────────────────────────────────────────────────┐
│ CONTROL A LOCATION OF THE MAGNIFICATION AREA WITH       │
│ RESPECT TO THE TOUCH SCREEN IN ACCORDANCE WITH A        │
│ MOVEMENT COMMAND RECEIVED FROM A USER.                  │
│ 640                                                     │
└─────────────────────────────────────────────────────────┘
                            │
                            ▼
┌─────────────────────────────────────────────────────────┐
│ REMOVE THE POINTER TO TERMINATE THE SESSION.            │
│ 650                                                     │
└─────────────────────────────────────────────────────────┘
```

FIGURE 6

METHOD AND SYSTEM FOR NAVIGATING A DISPLAY SCREEN FOR LOCATING A DESIRED ITEM OF INFORMATION

BACKGROUND OF THE INVENTION

1. Field of the Invention

The present invention relates to the field of computer systems and data communication. More specifically embodiments of the present invention relate to the field of displaying information on screens of portable electronic devices, such as personal computers, personal digital assistants (PDAs), cell phones, pagers, digital watches, etc.

2. Related Art

The popularity of portable computers caused consumer demand for new features that are commensurate with the nature and method of use of portable devices. Furthermore, the advent of the Internet and ever increasing reliance on electronic mail presented more requirements regarding how portable devices interface with the Internet and electronic mail systems.

To respond to the market demand, manufacturers incorporated customer requirements into the design of their new products and made improvements in their existing capabilities. An improved portable computer, responding to the consumer requirements, requires a display capable of showing a plurality of icons and information. The icons may represent any information, e.g., an assortment of sorted data in a data base, pages of information down-loaded from the Internet, pages of text received via electronic-mail, and in some instances maps of cities displaying street lay-outs and the like.

Displaying pages of textual data, maps of cities or the ever-increasing number of icons takes a vast amount of display screen area. However, supporting such features is not compatible with the customer requirements for a "small size device." Therefore, the designers of a portable computer have to either limit their designs to display screens capable of displaying a smaller amount of information or to enlarge the size of the display, neither of which may satisfy all customer requirements.

Furthermore, portable electronic devices are typically employed while the user is on the run, e.g., in business meetings, on business travel, personal travel, in a vehicle, on foot, etc. Ideally, a user of a portable device needs to retrieve a maximum amount of information, display the information on a limited amount of display space, and in the shortest period of time. Such constraints can benefit from an improved system or an improved method for searching and presenting the information to the user. Conventional portable electronic devices can benefit from improved methods of retrieving, displaying and legibly presenting information to users.

Thus a need exists for a device capable of retrieving information with a minimum number of inquiries. Furthermore, a need exists for a user to be able to search and retrieve desired data in an expeditious manner. Additionally, a need exist for a user-friendly device that is easily portable, contains a large amount of information which can be sorted and conveniently retrieved. The present invention provides a novel solution to these requirements.

SUMMARY OF THE INVENTION

An embodiment of the present invention enables a user to retrieve a desired item of information from a large number of items of information stored in a portable computer with a minimum number of inquiries. Typically, the information displayed on a display screen of the portable computer is virtually expanded in all directions, outside the viewing area of a user of the portable computer. Furthermore, zoomed-out fonts and images are used to fit large documents received from the Internet, via the e-mail or the like on a small display screen of a portable computer. An electronic magnifier is placed over the zoomed-out information displayed on the display screen.

The magnifier can be used, similar to a pointer in a conventional personal computer, to scroll the displayed information in all directions while the information passes under the magnifier. As the information passes under the magnifier, a user can bring to view the information beyond the viewing area and with enhanced legibility due to magnification.

According to one embodiment of the present invention a user points a pointer (e.g., a stylus, a mouse pointer, or even the user's finger) at the display screen invoking a Fly Over user interface (FOUI). Invocation of the FOUI initiates a search or a navigation session. The navigation session is initiated when the current view is zoomed-out and a magnifying rectangle appears on the display screen over the displayed items of information. Accordingly, the items of information directly under and within the magnifying rectangle are zoomed-out by an order of 2-n degrees of magnification, which makes the information clearly visible and legible to the user. In one embodiment of the present invention a user determines the degree of magnification and zoom-out of the items.

Another embodiment of the present invention enables a user to scroll the displayed information by moving the magnifying rectangle in all directions in search of the desired item of information while the displayed information are passing under the magnifying rectangle and are magnified. The present invention enables a user to search for information in different layers and sub-layers. The user may terminate the navigation session by removing the pointer from the display screen and the invention allows the user to resume with the normal operation of the device.

More specifically, embodiments of the present invention are directed to a method for retrieving information providing a magnifying window on a display of a digital device wherein the display shows a plurality of items. The user activates the magnifying window by touching the screen with a pointer. The user scrolls the magnifying window over the display screen and locates a desired item of information of the plurality of items of information. By pointing on the desired item of information, detail information can be displayed. Removing the pointer from the screen deactivates magnifying window, restores view zoom factor and terminates the navigation session.

Embodiments of the present invention are also directed to a method and a system for navigating through information of a display screen to search for a desired item of information stored in an electronic device. The electronic device includes a user interface capable of receiving commands from a pointer to activate a magnifying window. A user may commence a navigation session by touching the display screen in a non-active area or by clicking on a specifically designated icon to activate the user interface. The user interface enables the user to scroll the magnifying window in all directions over the zoomed-out display to find a desired item of information. The display may be a display screen of a digital device (e.g., portable computer, personal computer, a cellular telephone, a digital watch, etc). The user may drag the pointer over the desired item of information to retrieve detailed information contained therein. The user may terminate a navigation session by removing the pointer from the screen and resuming normal operation.

DETAILED DESCRIPTION OF THE INVENTION

Reference will now be made in detail to the preferred embodiments of the present invention, a method and a system for navigating a display screen for locating a desired item of information, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

The present invention is compatible with any electronic device having a wireless or other communication mechanism and contains organized records of information, such as a portable computer system, a cell phone, a digital watch or a pager. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, digital watches, pagers, etc.

Figure 1:
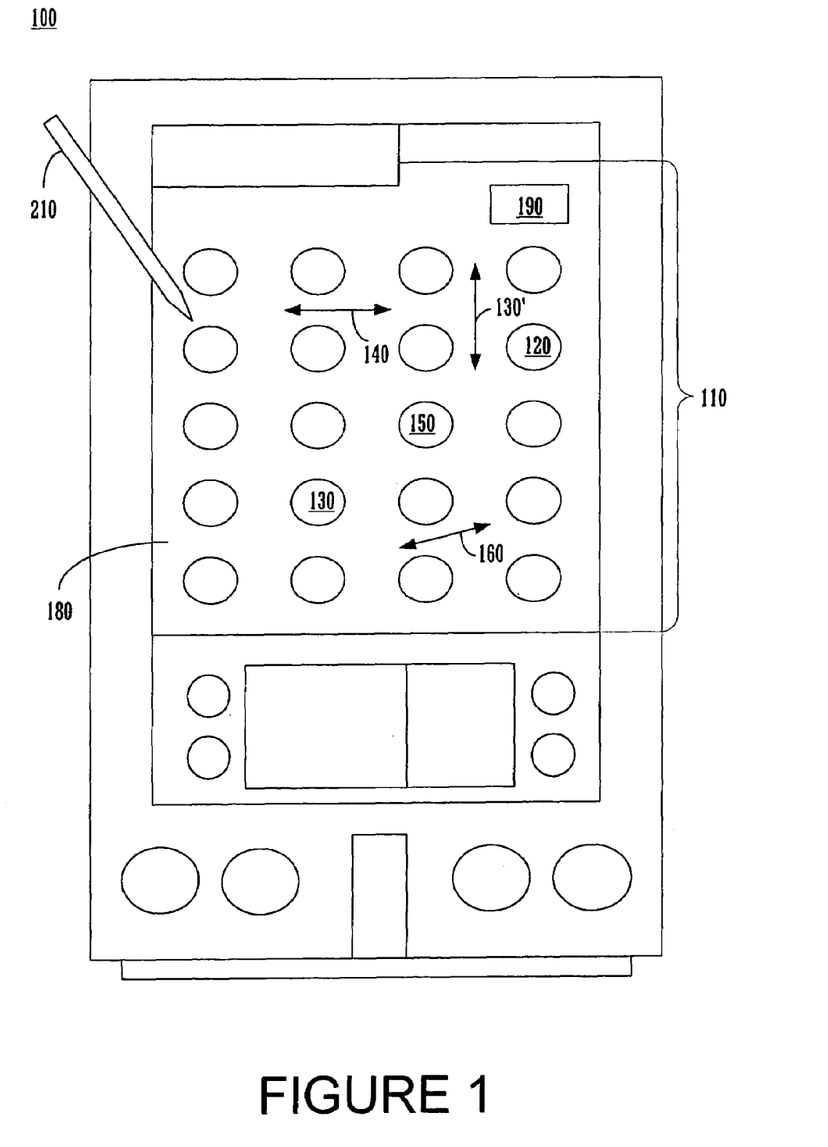
FIG. 1 depicts a typical portable computer with a plurality of icons displayed on its display screen.

FIG. 1 depicts an exemplary Personal Digital Assistant (PDA) 100 (e.g., during a normal operating mode). The PDA 100 is also known as a palmtop or palm-sized electronic device or portable computer system. The PDA 100 stores substantial items of information in its memory. The information may be stored in accordance with a plurality of views of a database organized in different files created by a user. Numerous icons, represented by circles in FIG. 1, displayed on display screen 110 (e.g. graphical user interface) may represent a plurality of data base views or the files stored in the memory. Each icon displayed on display screen 110 is labeled to identify the file or the view of a database it represents.

For example icon 130 may represent a file storing all received e-mails. Similarly icon 120 may represent a file where maps of different cities are stored, or icon 150 may be associated with a data base view of all expenses by the user during January 2000. A user can retrieve information associated with an icon by activating that particular icon. An icon may be activated in a variety of methods (e.g., touching the icon with a stylus, touching the icon with the user finger, touching the icon with a pointer or the likes).

The PDA 100 also has the capability to transmit and receive data and information over a wireless communication interface (e.g., a radio interface). The PDA 100 implements an exemplary graphical user interface providing a fly over mode.

In one embodiment of the present invention icon 190 is specifically designed for the purpose of invoking the fly over mode. A user can invoke fly over mode by touching a non-active area 180 of display screen 110 with stylus 210 or in the alternative click on icon 190. It is appreciated that the non-active area 180 of display screen 110 may be an area which is not occupied by icons.

Figure 2:
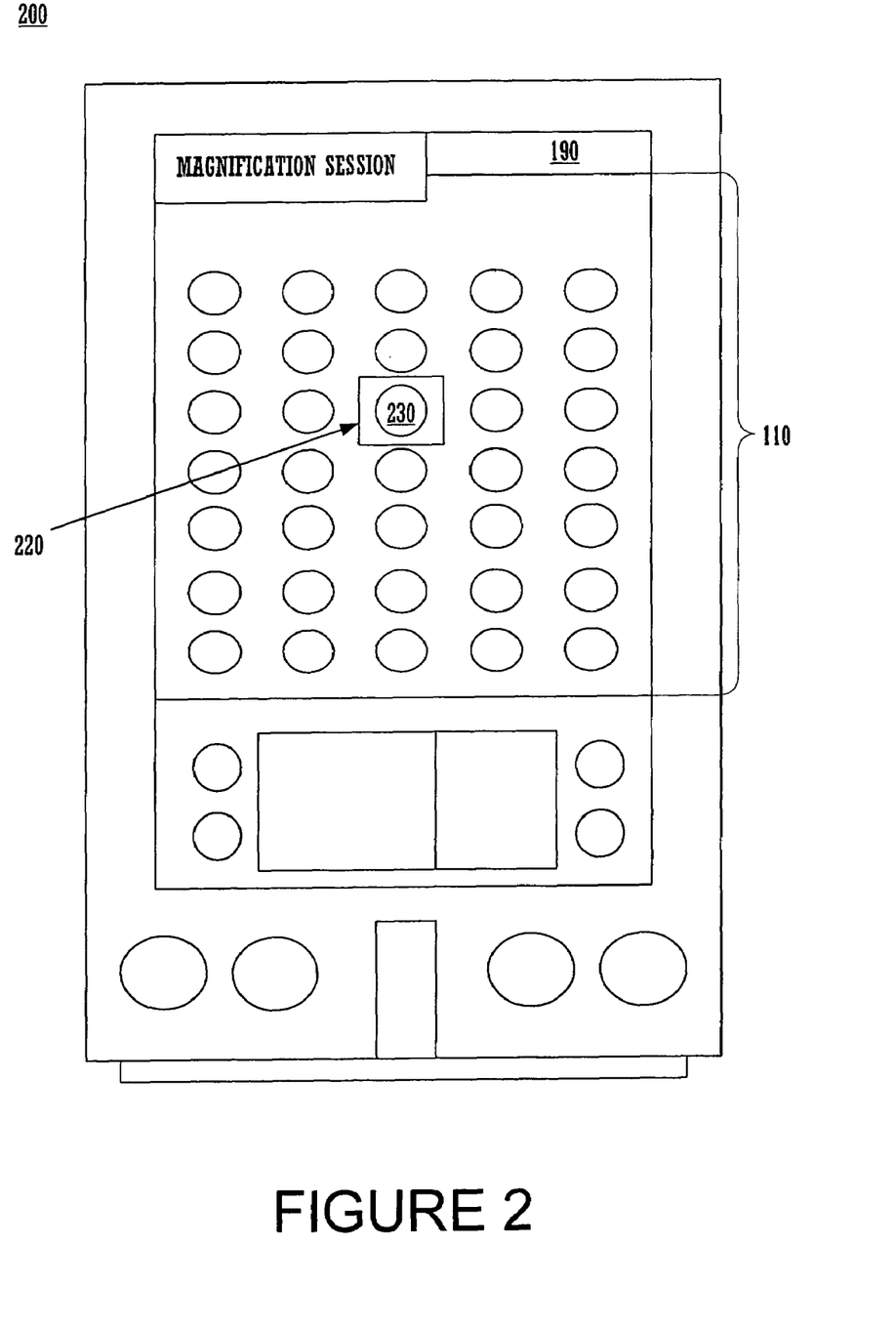
FIG. 2 depicts the display screen of a typical portable computer when a navigation session is initiated and, in response, the display is zoomed-out and a magnifying rectangle appears on the display screen.

FIG. 2 depicts an embodiment of the present invention, where a user may initiate a fly over mode. During the fly over mode, a larger number of icons and fly over area 220 appear on display screen 110. FIG. 2 illustrates an exemplary view of display screen 110 during fly over mode while fly over area 220 is placed over icon 230. Icon 230 viewed through the fly over area 220 appears larger than The other icons on display screen 110. During fly over mode not all icons can be displayed on display screen 110. The display of some of the icons is extended beyond the borders of display screen 110. However, all icons can be brought into view on display screen 110 by scrolling the icons in directions 130, 140 and 160 of FIG. 1.

For example, FIG. 1 depicts PDA 100 during a normal mode of operation showing a small number of icons on display screen 110, although a large number of icons are extended outside the viewing area and not visible to the user. FIG. 2 illustrates the viewing area of display screen 110 after fly over mode is invoked. During the fly over mode, a larger number of icons, smaller in size (e.g., feature size), appear on the viewing area of display screen 110. Appearance of a larger number of icons on display screen 110 facilitates a subsequent search for a target icon. During this session, a user has access to a larger number of icons while the user can fly over the smaller size icon with a magnifying tool, fly over area 220, with enhanced visibility.

Another embodiment of the present invention enables a user to control magnification power of fly over area 220. For example, a user may display an object displayed through display screen 110 twice as large as its smaller size by selecting two degrees of magnification. By using a "2" degree of magnification, the items of information directly under and within the magnifying fly over area 220 will be zoomed in and appear as large as its original size during the normal operating mode, while other non-magnified items will be zoomed-out and appear smaller in size by a factor of "2", thus the zoomed in item becomes clearly visible and legible to the user.

A navigation session begins when a user drags the fly over area 220 in direction 130, 140 or 160 of FIG. 1, in search of an item of information (e.g., icon 330). The user drags the fly over area 220 across display screen 110 with the aid of stylus 210.

Figure 3:
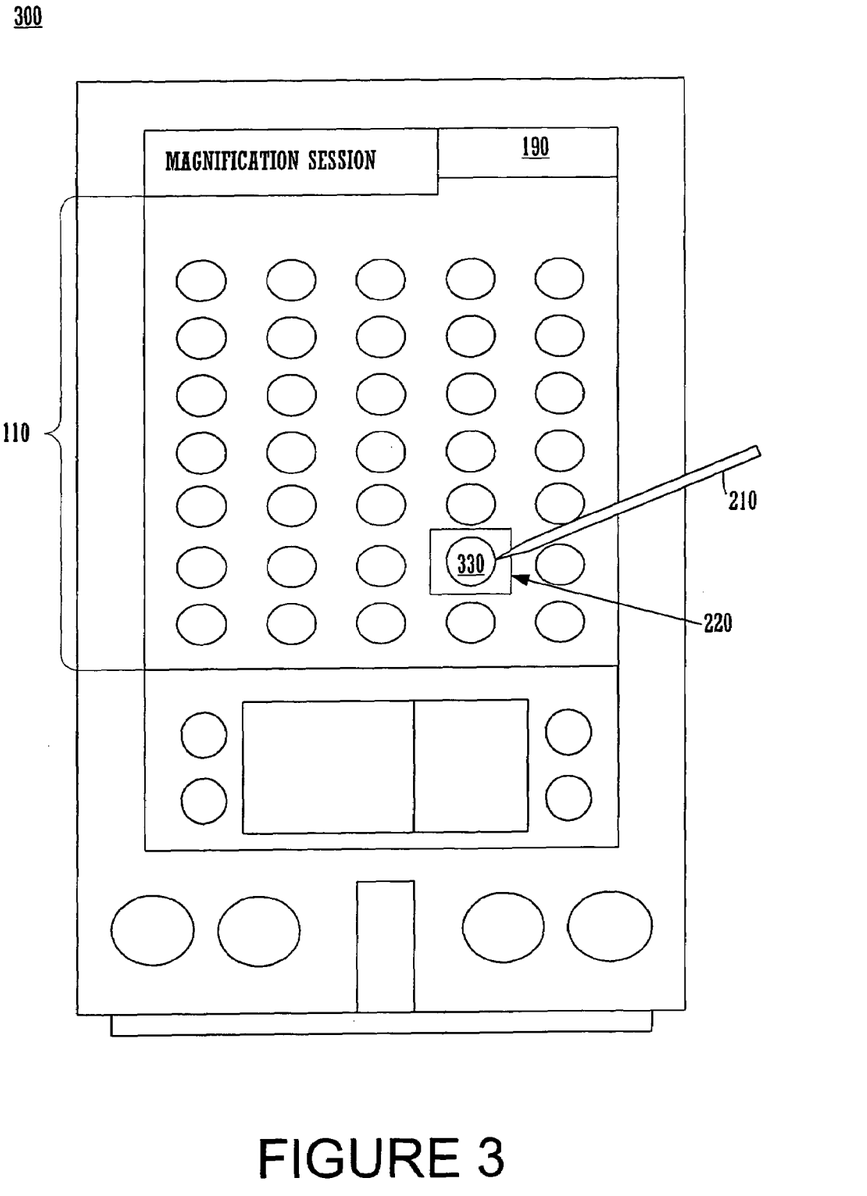
FIG. 3 illustrates the movement of a magnifying rectangle and the scrolling of the information while a user is searching for a desired item of information.

FIG. 3 illustrates a navigation session for locating a desired item of information (e.g., icon 330). The user places stylus 210 over the fly over area 220 and moves stylus 210 in direction 130, 140 and 160 of FIG. 1. The user navigates display screen 110 until icon 330 is found under the fly over area 220.

FIG. 1 also depicts display screen 110 when the fly over mode session is terminated. In one embodiment of the present invention, the user may terminate the fly over mode session by removing stylus 210 from display screen 110. When the fly over mode session is terminated, display of icons on display screen 110 return to their normal size as depicted in FIG. 1.

Figure 4A:
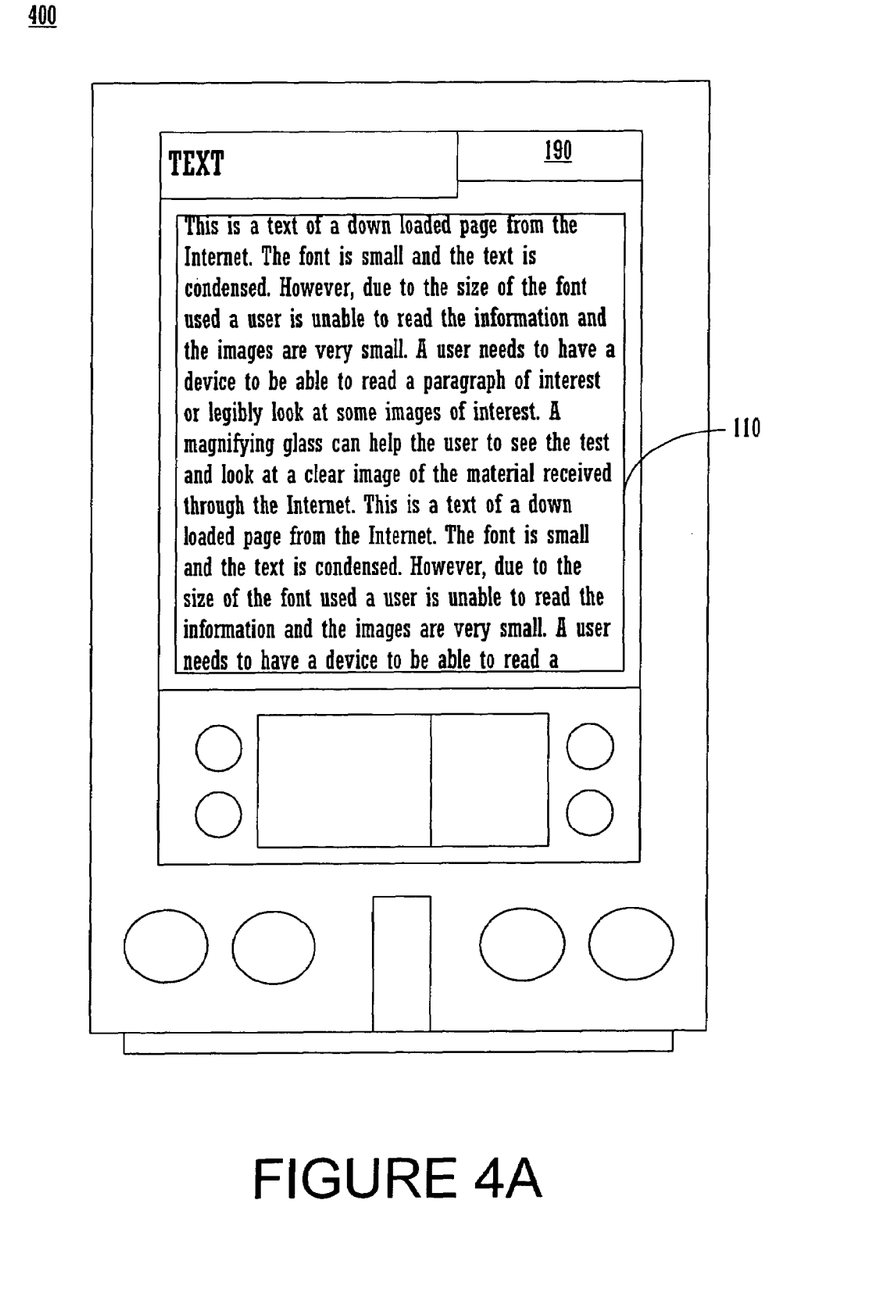
FIG. 4A and FIG. 4B illustrate a search for a desired item of information while FOUI magnifies the displayed information thereby enhancing the visibility and facilitating the search.
Figure 4B:
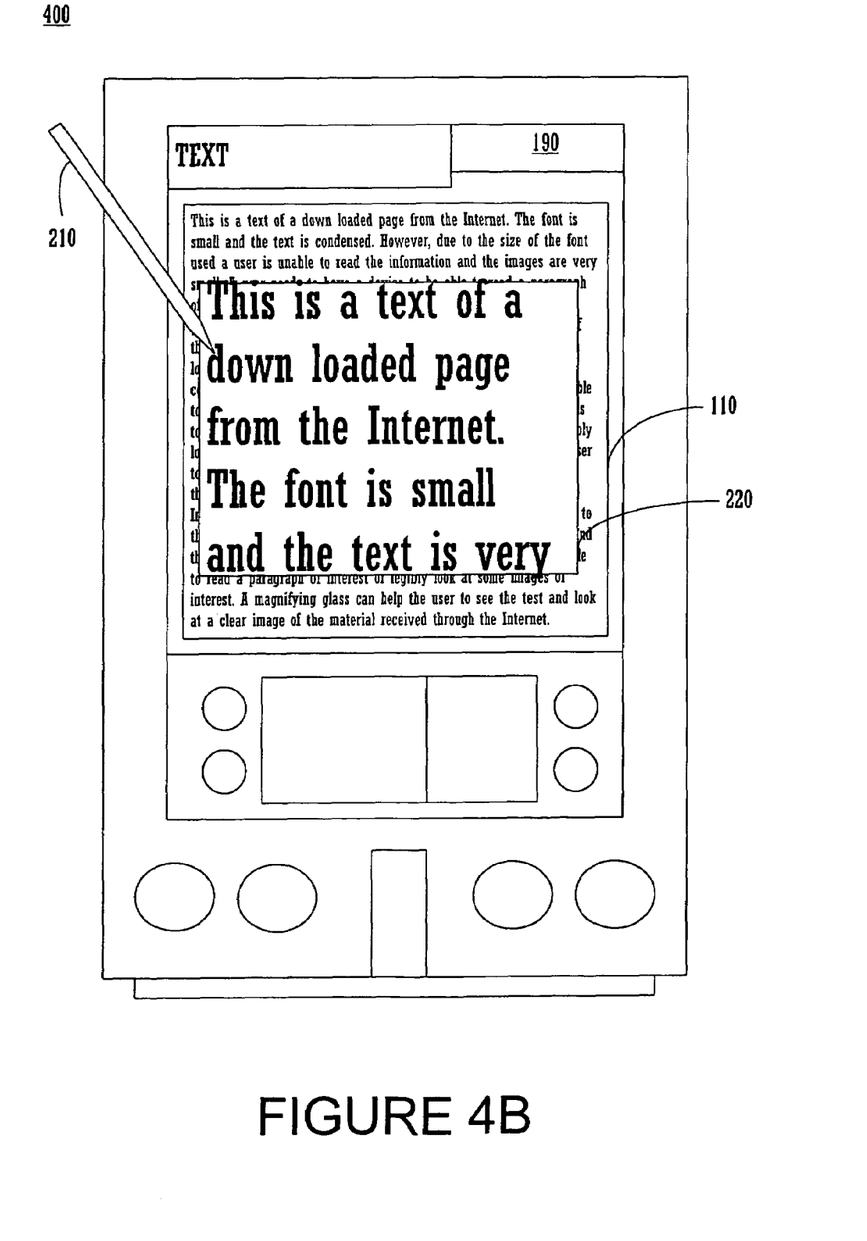

FIG. 4A and FIG. 4B illustrate one embodiment of the present invention where the user furthers the search beyond locating icon 330. The user may activate icon 330 by pressing stylus 210 on icon 330 or double clicking on icon 330 and cause display of information, e.g., text, associated with icon 330.

In another embodiment of the present invention, the user may search for a particular line or a particular sentence within the displayed text. The search is conducted by navigating display screen 110 by moving fly over area 220 in directions 130, 140 and 160 of FIG. 1. The navigation process will continue, while the fly over area 220 slides over the text and enhancing the legibility, until the desired line or the desired sentence is found. It is appreciated that the detail of information is not limited to textual data, and in other embodiment of the present invention the detail information may be graphics, tables of numbers, calendars, maps of cities, telephone directories or the like.

FIGS. 5A, 5B, 5C, and 5D are exemplary illustrations of an embodiment of the present invention. According to this embodiment of the present invention, a user of system 500, equipped with a fly over area, can search for an address and a direction to a named location in a city. System 500 is equipped with an internal memory (e.g., hard disk, RAM, PROM, RAM, EPROM, etc.) and may be adapted to receive an add-in memory card complying with PCMCIA (e.g., PC card). The internal memory or the add-in memory card contains the addresses for the residential and businesses located in the city B, along with the map of the city B. Furthermore, for the sake of this example, a user of the device can use system 500 to find a direction to a residential address 1322 on the $9^{th}$ street.

Figure 5A:
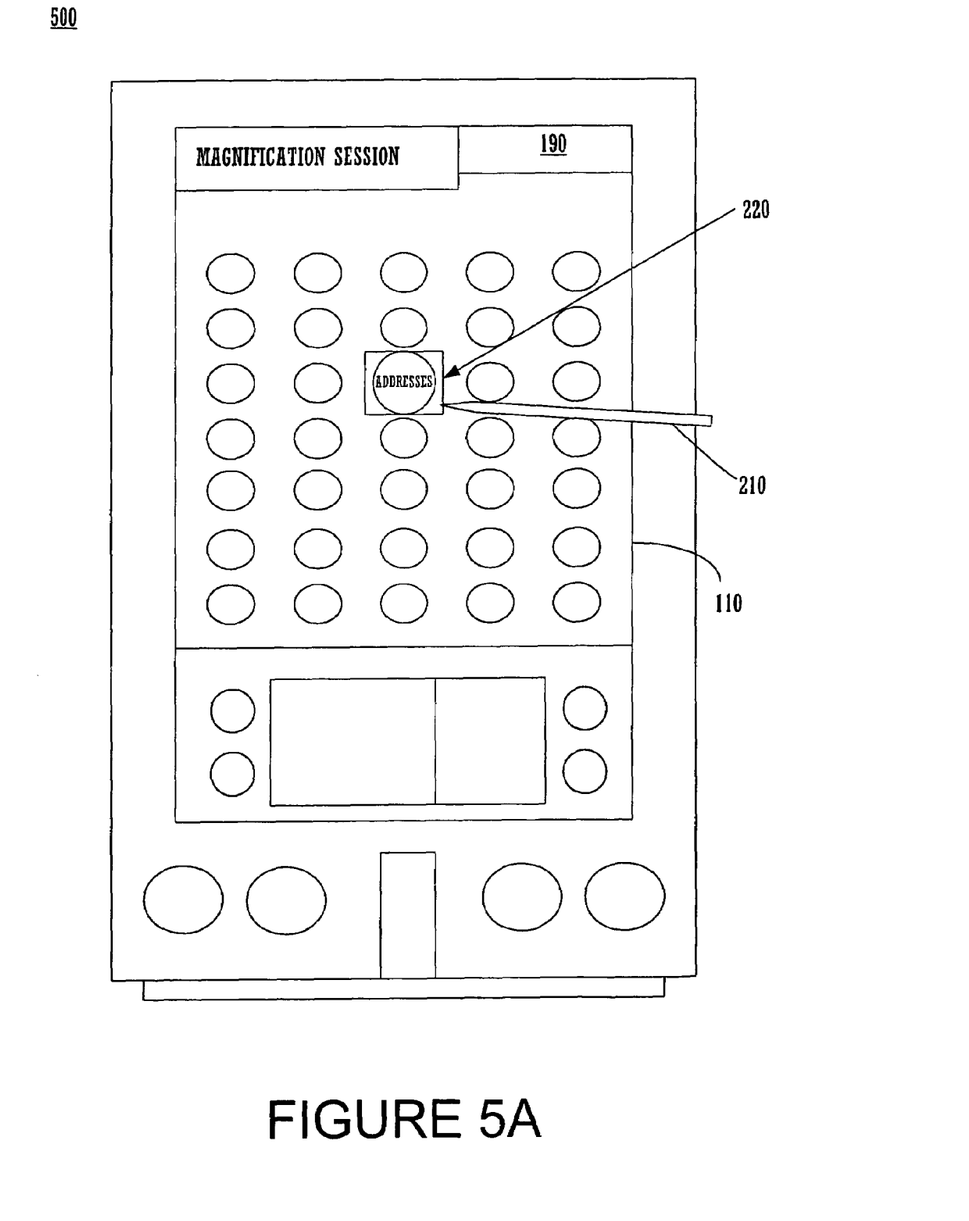
FIG. 5A is an exemplary illustration of an embodiment of the present invention searching for and finding an address on a portable computer.

FIG. 5A depicts display screen 110 when a fly over display mode session has been initiated. A fly over display mode session is initiated when fly over area 220 appears on display screen 110. The user then can navigate display screen 110 by moving fly over area 220 using stylus 210 in direction 130, 140 and 160 of FIG. 1. As the user moves fly over area 220 in directions 130, 140, and 160 of FIG. 1, the information outside the viewing area will scroll into the user viewing area. The navigation of information and scrolling of the information may continue until the desired item of information is found and placed under fly over area 220. FIG. 5A depicts an instant where icon labeled "Addresses" is found and is under fly over area 220.

Figure 5B:
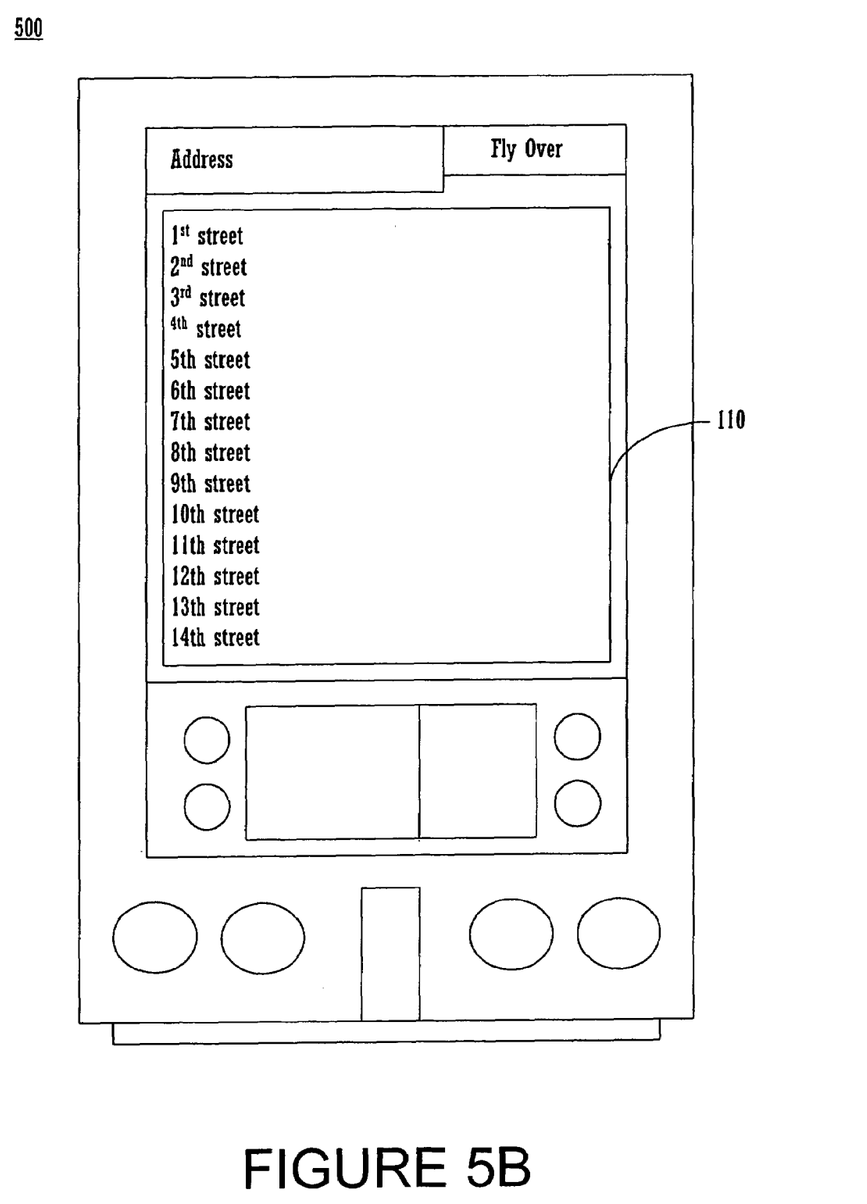
FIGS. 5B, 5C and 5D are an exemplary illustrations of embodiments of the present invention viewing the address and a map of a desired address.

FIG. 5B illustrates the next session in the search for the desired address 1322 on the $9^{th}$ street after icon labeled "addresses" is found. FIG. 5B illustrates that the user has terminated the fly over display mode session by removing stylus 210 from display screen 110. FIG. 5B depicts display screen 110 in its normal mode of operation and a smaller number of icons, including the desired icon labeled "addresses" remain on display screen 110 (e.g., a first amount of a graphical user interface).

Figure 5C:
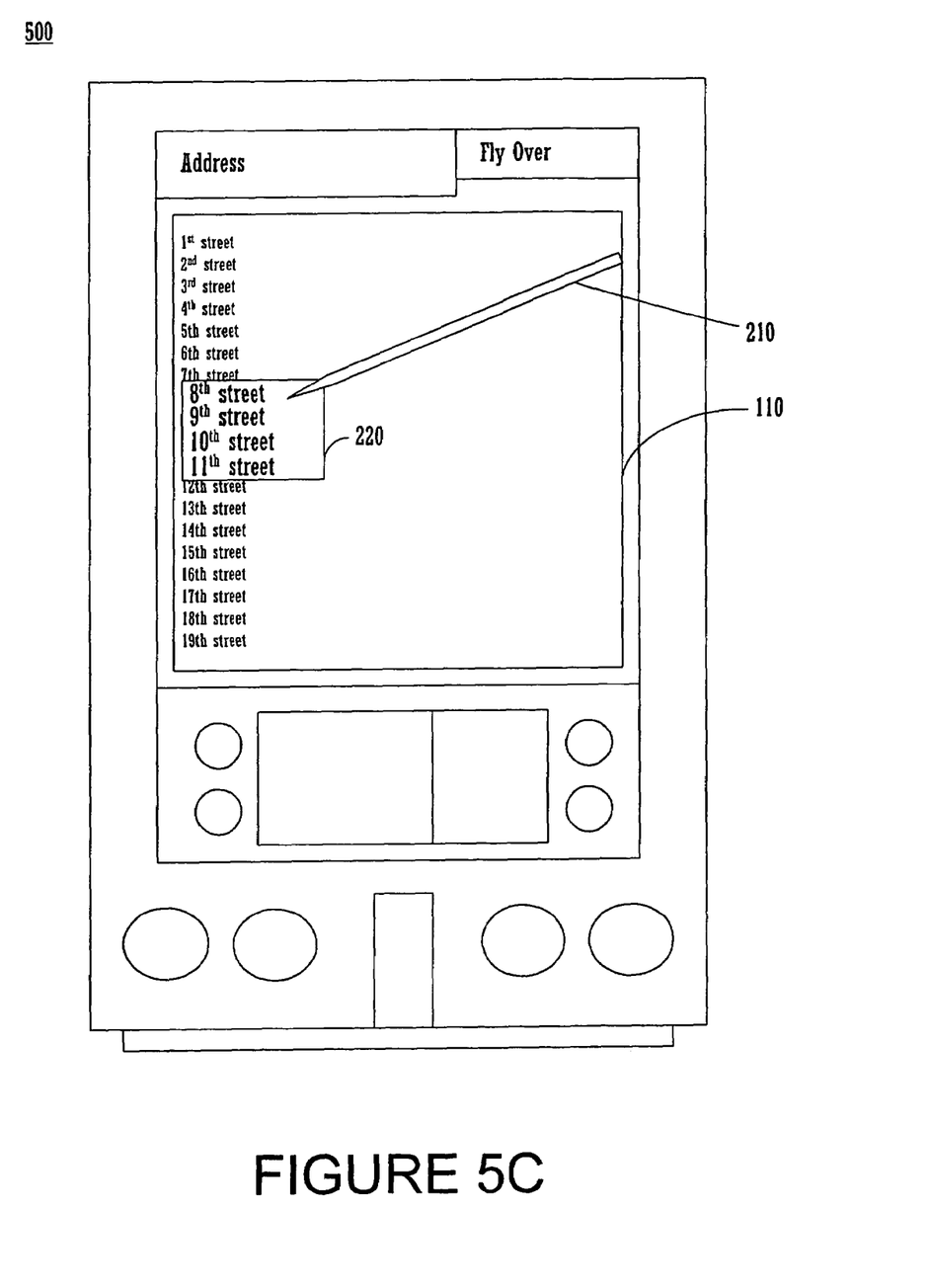

FIG. 5C is another embodiment of the present invention, where the user of system 500 who wishes to find the location of and a direction to 1322, $9^{th}$ street in city B continues the search and finds the list of the streets in the city. The user activates icon labeled "addresses" and a list of streets will appear on screen 110. The user scrolls the list in the directions 130, 140 or 160 of FIG. 1 until $9^{th}$ street appears under a fly over area 220. It is appreciated that the sizes of the text in the fly over area 220 is larger than the size of text displayed on the rest of the display screen 110. However, the text outside the fly over area 220 is smaller than the text originally displayed, as shown in FIG. 5B. Thus, more text in the graphical user interface is now viewable.

Figure 5D:
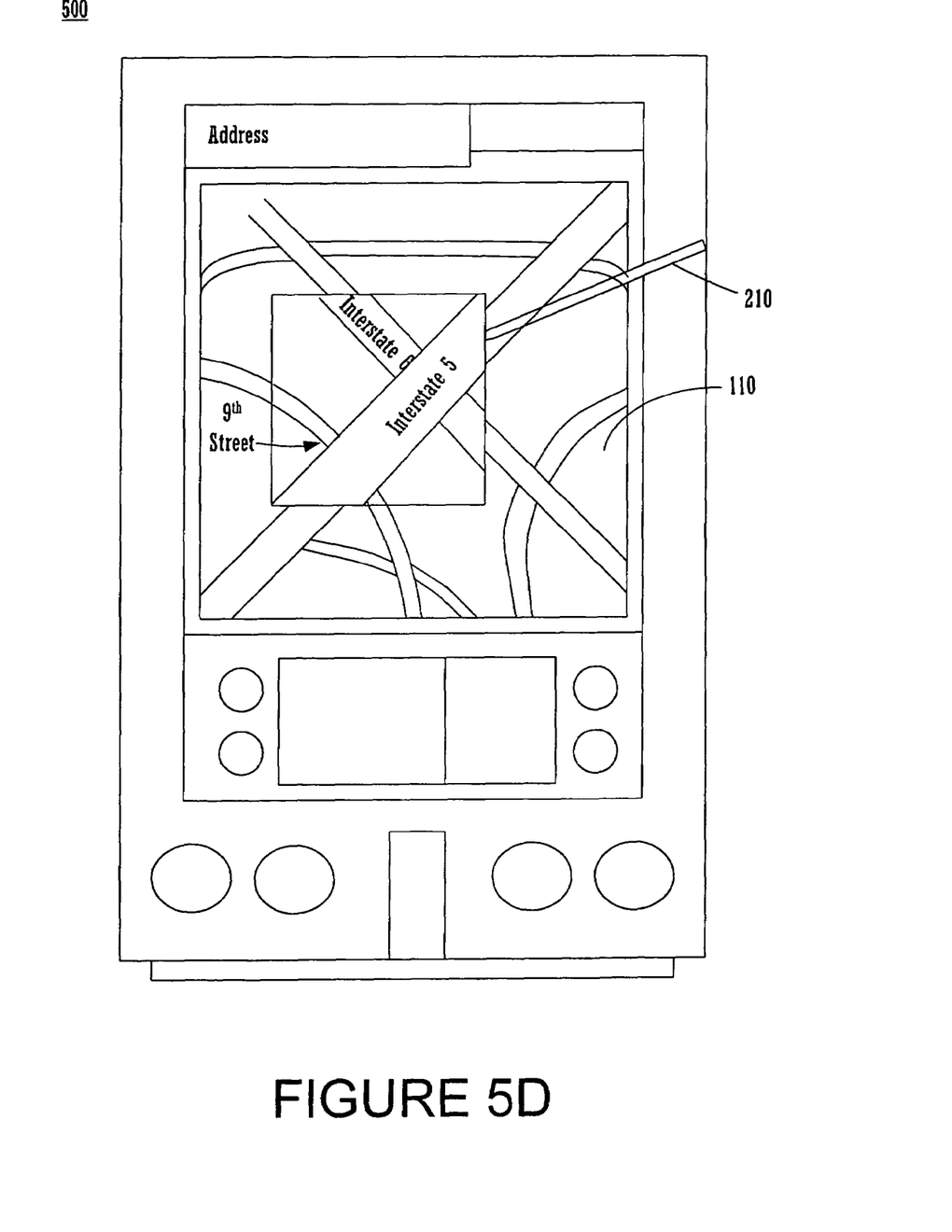

FIG. 5D illustrates a view of a section of the map of the city B, where the $9^{th}$ street is located. The user points stylus 220 on $9^{th}$ street in FIG. 5B to get geographical location of $9^{th}$ street. Accordingly, location of $9^{th}$ street in relation with two major Interstates freeways will appear under fly over area 220.

Figure 6:
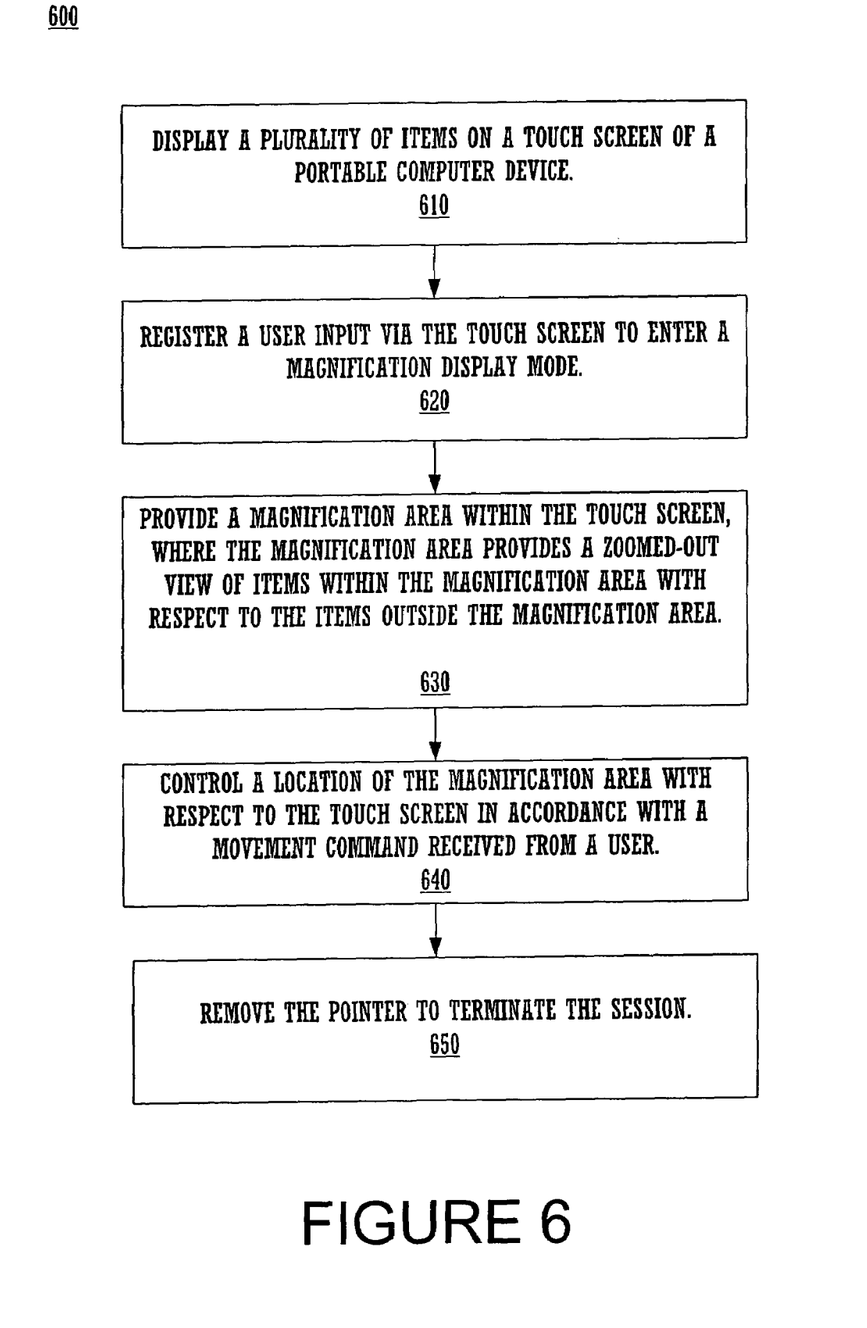
FIG. 6 is a flowchart of the steps of a process 600 of initiating a Fly Over user interface (FOUI) and navigation of information in search of a desired item of information in accordance with an embodiment of the present invention.

FIG. 6 is a flowchart of the steps in a process 600 for initiating a fly over mode and navigation of information in search for a desired item of information.

In step 610 of FIG. 6, in one embodiment of the present invention, a user can activate the fly over mode by pointing a pointer to a non-active area of a display screen. In another embodiment of the present invention, a user can activate the fly over mode by clicking on an icon, on the display screen, which is specifically designated for activation of the fly over mode.

In step 620 of FIG. 6, a fly over area appears on the display screen and the user can move the fly over area in all directions by holding the pointer on the magnifying area and dragging the pointer in different directions. During the fly over mode, a larger number of items of information, which are smaller in size (e.g., feature size), are displayed on the display screen.

In step 630 of FIG. 6, the user moves the fly over area over the displayed information on the display screen to locate a desired item of information. Items of information appearing within the perimeter of the fly over area are magnified and are clearly legible.

In step 640 of FIG. 6, once the user finds the desired item of information, the search may continue to get detail of the desired item of information. The user points the pointer on the desired item of information and clicks on the desired item of information.

In step 650 of FIG. 6, the user may terminate the navigation session and exit the fly over mode by removing the pointer from the screen. Once the session is terminated, the display screen displays items of information in their normally displayed sizes.

In summary, the present invention provides a method and a system that enables a user to search through items of information, on a small display screen of a portable device, and expeditiously find a desired item of information and legibly present the item of information to the user. In accordance with the present invention, the portable computer system may have the desired item of information stored in its database or in a PC card. It is appreciated that the embodiments of the present invention can be readily applied to the information received from the Internet or through the e-mail. While the present invention has been described in particular embodiments, it should be appreciated that the present invention should not be construed as limited by such embodiments, but rather construed according to the below claims.

What is claimed is:

1. A method for implementing a touchscreen user interface for a device, the method comprising:
   a) displaying a plurality of items in a normal mode on a touchscreen of a portable electronic device;
   b) registering a user input to enter a fly over mode;
   c) in response to b), providing a fly over area within the touchscreen, wherein the fly over area provides a magnified view of items within the fly over area with respect to items outside the fly over area, and wherein items outside the fly over area are shrunk with respect to the items in the normal mode and the ones of the items, which are shrunk, are shrunk by a same constant factor with respect to the items in the normal mode;
   d) controlling a location of the fly over area with respect to the touchscreen in accordance with a movement command received from a user; and
   e) in response to d), scrolling a display contents of the touchscreen when the fly over area reaches an edge of the touchscreen.

2. The method of claim 1 wherein the movement command for controlling the location of the fly over area with respect to the touchscreen comprises a user dragging a navigation pointer across the touchscreen.

3. The method of claim 1 further comprising:
   exiting the fly over mode when the user stops controlling the location of the fly over area.

4. The method of claim 3 wherein the navigation pointer is a stylus.

5. A computer readable media having computer readable code for implementing a method for a touchscreen user interface for a device, the code when executed by a computer system of the device causes the device to implement a method comprising:
   a) displaying a plurality of items in a normal mode on a touchscreen of a portable electronic device;
   b) registering a user input via the touchscreen to enter a fly over mode;
   c) in response to b), providing a fly over area within the touchscreen, wherein the fly over area provides a magnified view of items within the fly over area with respect to items outside the fly over area, and wherein items outside the fly over area are shrunk with respect to the items in the normal mode and the ones of the items, which are shrunk, are shrunk by a same constant factor with respect to the items in the normal mode;
   d) controlling a location of the fly over area with respect to the touchscreen in accordance with a movement command received from the user; and
   e) in response to d), scrolling a display area contents of the touchscreen when the fly over area reaches an edge of the touchscreen.

6. The computer readable media of claim 5 wherein the movement command for controlling the location of the fly over area comprises a user dragging a navigation pointer across the touchscreen.

7. The computer readable media of claim 6 wherein the method further comprises exiting the fly over mode when the user stops controlling the location of the fly over area.

8. The computer readable media of claim 7 wherein the navigation pointer is a stylus.

* * * * *